United States Patent
Strmcnik et al.

(10) Patent No.: US 9,065,142 B2
(45) Date of Patent: Jun. 23, 2015

(54) FUEL CELL ELECTRODES

(75) Inventors: Dusan Strmcnik, Woodridge, IL (US); Angel Cuesta, Madrid (ES); Vojislav Stamenkovic, Naperville, IL (US); Nenad Markovic, Hinsdale, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 207 days.

(21) Appl. No.: 13/536,612

(22) Filed: Jun. 28, 2012

(65) Prior Publication Data

US 2013/0004886 A1 Jan. 3, 2013

Related U.S. Application Data

(60) Provisional application No. 61/502,412, filed on Jun. 29, 2011, provisional application No. 61/512,590, filed on Jul. 28, 2011.

(51) Int. Cl.
*H01M 4/02* (2006.01)
*H01M 4/92* (2006.01)
*C23C 22/02* (2006.01)
*H01M 4/86* (2006.01)

(52) U.S. Cl.
CPC .............. *H01M 4/921* (2013.01); *H01M 4/86* (2013.01); *H01M 4/92* (2013.01); *H01M 4/8621* (2013.01); *C23C 22/02* (2013.01); *Y02E 60/50* (2013.01)

(58) Field of Classification Search
CPC ........ H01M 4/86; H01M 4/8621; H01M 4/92
USPC ................................................. 429/523, 524
See application file for complete search history.

(56) References Cited

U.S. PATENT DOCUMENTS

| | | | |
|---|---|---|---|
| 6,818,117 B2 | 11/2004 | Ferguson et al. |
| 6,899,947 B2 | 5/2005 | Wei et al. |
| 6,951,690 B2 | 10/2005 | Katz et al. |
| 7,422,994 B2 | 9/2008 | Chondroudis et al. |
| 7,871,738 B2 | 1/2011 | Stamenkovic et al. |
| 8,178,463 B2 | 5/2012 | Stamenkovic et al. |
| 2002/0015778 A1 | 2/2002 | Effenberger |
| 2008/0206103 A1 | 8/2008 | Pinnaduwage et al. |

OTHER PUBLICATIONS

Cuesta, A., "At Least Three Contiguous Atoms are Necessary for CO Formation During Methanol Electrooxidation on Platinum", J. Am. Chem. Soc., 128, (2006), pp. 13332-13333.

Cuesta, A. et al., "Cylic Voltammetry, FTIRS, and DEMS Study of the Electrooxidation of Carbon Monoxide, Formic Acid, and Methanol on Cyanide-Modified Pt(111) Electrodes", Langmuier, 25(11), (2009) pp. 6500-6507.

Cuesta, A. et al., "Electrochemical and FTIRS characterisation of NO adlayers on cyanide-modified Pt(111) electrodes: the mechanism of nitric oxide electroreduction on Pt," Physical Chemistry Chemical Physics 10, (2008), pp. 3628-3634.

(Continued)

*Primary Examiner* — Jane Rhee
(74) *Attorney, Agent, or Firm* — Foley & Lardner LLP

(57) ABSTRACT

A process includes patterning a surface of a platinum group metal-based electrode by contacting the electrode with an adsorbate to form a patterned platinum group metal-based electrode including platinum group metal sites blocked with adsorbate molecules and platinum group metal sites which are not blocked.

20 Claims, 5 Drawing Sheets

(56) References Cited

OTHER PUBLICATIONS

Escribano, M.E. et al., "Diseño A Nivel Atómico De Superficies Electrocatalíticas: Reduccion De Oxigeno Sobre Electrodos De Pt(111) Modificados Con Cianuro", (2010), 1 page. English Translation Not Available.

Frank, D.G. et al., "pH and Potential Dependence of the Electrical Double Layer at Well-Defined Electrode Surfaces: $Cs^+$ and $Ca2^+$ st PT(111) $(2\sqrt{3}\times 2\sqrt{3})R30°$-CN, Pt(111) $(\sqrt{13}\times\sqrt{13})R14°$-CN, and Pt(111) $(2\times 2)$-SCN", Langmuir, 1, (1985), pp. 587-592.

Friedrich, K.A. et al., In-Situ Spectroscopy of Cyanide Vibrations on Pt(111) and Pt(110) Electrode Surfaces: Potential Dependencies and the Influence of Surface Disorder, Surf. Sci., 335, (1995), pp. 315-325.

Garcia, N. et al., "Effect of pH and alkaline metal cations on the voltammetry of Pt(111) single crystal electrodes in sulfuric acid solution", Chem. Phys. Chem, 5, (2004), pp. 1221-1227.

Gasteiger, H.A. et al., "Just a dream—or future reality", Science, vol. 324, (Apr. 13, 2009), pp. 48-49.

Genorio, B. et al., "Tailoring the Selectivity and Stability of Chemically Modified Platinum Nanocatalysts to Design Highly Durable Anodes for PEM Fuel Cells", Angew. Chem., (2011), 6 pages.

Genorio, B. et al., "Selective Catalysts for the Hydrogen Oxidation and Oxygen Reduction Reactions by Patterning of Platinum with Calix[4]arene Molecules", Nature Materials, Published Online Oct. 31, 2010, 6 pages.

Genorio, B. et al., "Synthesis and Self-Assembly of Thio Derivatives of Calix[4]arene on Noble Metal Surfaces", Langmuir, vol. 24, No. 20, (2008), pp. 11523-11532.

Greeley, J. et al., "Alloys of Platinum and Early Transition Metals as Oxygen Reduction Electrocatalysts", Nature Chem., vol. 1 (Oct. 2009), pp. 552-556.

Gutsche, C.D. et al., "Calixarenes 12 the Synthesis of Functionalized Calixarenes", Tetrahedron, vol. 42, No. 6, (1986), pp. 1633-1640.

Gutsche, C.D. et al., "Calixarenes. 16. Functionalized Calixarenes: The Direct Substitution Route", Journal of Organic Chemistry, 50, (1985), pp. 5795-5802.

Gutsche, C.D. et al., "p-tert-BUTYLCALIX[4]ARENE", Organic Syntheses, vol. 68, (1990), pp. 234-236.

Hubbard, A.T., "Electrochemistry at Well-Characterized Surfaces", Chem. Rev., 88, (1988), pp. 633-656.

Huerta, F.J. et al, Voltammetric and Spectroscopic Characterization of Cyanide Adlayers on Pt(h,k,l) in an Acidic Medium, Surf. Sci., 396, (1998), pp. 400-410.

Huerta, F. et al., "Spectroelectrochemical Study on $CN^-$ Adsorbed at Pt(111) in Sulphuric and Perchloric Media", Electrochim. Acta, 44, (1998), pp. 943-948.

Huerta, F. et al., "Structural Effects of Adsorbed CN Adlayers on the Co-Adsorption of OH at the Pt(111) Surface in Sulfuric Acid Medium", Surf. Sci., 431, (Apr. 22, 1999), pp. L577-L581.

Huerta, F. et al., "Potential Modulated Reflectance Spectroscopy of Pt(111) in Acidic and Alkaline Media: Cyanide Adsorption", J. Electroanal. Chem., 463, (1999), pp. 109-115.

Inuaki, J. et al., "Cation Effects on Infrared Reflection Absorption Spectra of Cyanide Adsorbed on Pt(111) Electrode in Electrolyte Solutions", Bulletin of the Chemical Society of Japan, 70, (1997), pp. 1787-1794.

Kenis, P.J.A. et al., "Supramolecular Materials: Molecular Packing of Tetranitrotetrapropoxycalix[4]arene in Highly Stable Films with Second-Order Nonlinear Optical Properties", Chemistry European Journal, 4, No. 7,(1998), pp. 1225-1234.

Kim, C.S. et al., "Cyanide Adsorbed as a Monolayer at the Low-Index Surface Planes of Platinum Metal Electrodes: An In Situ Study by Infrared Spectroscopy", Journal of Physical Chemistry, 97, (1993), pp. 9784-9787.

Kim, Y.G. et al., "Direct Observation of Complexation of Alkali Cations on Cyanide-Modified Pt(111) by Scanning Tunneling Microscopy", J. Am. Chem. Soc., 118, (1996), pp. 393-400.

Markovic, N.M. et al, "Surface Science Studies of Model Fuel Cell Electrocatalysts", Surf. Sci. Rep., 45, (2002), pp. 117-229.

Markovic, N.M. et al., "Kinetics of Oxygen Reduction on Pt(hkl) Electrodes: Implications for the Crystallite Size Effect with Supported Pt Electrocatalysts", J. Electrochem. Soc., vol. 144, No. 5, (May 1997), pp. 1591-1597.

Markovic, N.M. et al., Oxygen Reduction on Platinum Low-Index Single-Crystal Surfaces in Alkaline Solution: Rotating Ring-Disk$_{Pt}$(hkl) Studies, J. Phys. Chem., 100, (1996), pp. 6715-6721.

Markovic, N.M. et al., "Oxygen Reduction on Platinum Low-Index Single-Crystal Surfaces in Sulfuric Acid Solution: Rotating Ring-Pt(hkl) Disk Studies", J. Phys. Chem., vol. 99, No. 11, (Mar. 16, 1995), pp. 3411-3415.

Markovic, N.M. et al., "Temperature-Dependent Hydrogen Electrochemistry on Platinum Low-Index Single-Crystal Surfaces in Acid Solutions", J. Phys. Chem. B, 101, (1997), pp. 5405-5413.

Markowitz, M.A. et al., "Perforated Monolayers: Design and Synthesis of Porous and Cohesive Monolayers from Mercurated Calix[n]arenes", Journal of American Chemical Society, 111, (1989), pp. 8192-8200.

Mostany, J. et al., "Thermodynamic Studies of Anion Adsorption at Stepped Platinum(hkl) Electrode Surfaces in Sulfuric Acid Solutions", J. Phys. Chem. B, 106, (2002), pp. 12787-12796.

Mostany, J. et al., "Thermodynamic Studies of Phosphate Adsorption on Pt (1 1 1) Electrode Surfaces in Perchloric Acid Solutions", Electrochimica Acta, 54, (2009), pp. 5836-5843.

Munch, J.H. et al., "p-tert-BUTYLCALIX[8]ARENE", Organic Syntheses, CV8, 80, (1993), 2 pages.

Nilekar, A.U. et al., "Bimetallic and Ternary Alloys for Improved Oxygen Reduction Catalysis", Top Catal, 46, (2007), pp. 276-284.

Paulissen, V.B. et al., "Infrared Spectroscopy as a Probe of the Adsorption and Electrooxidation of a Cyanide Monolayer at Platinum Under Aqueous Electrochemical Conditions", J. Phys. Chem., vol. 96, No. 11, (1992), pp. 4563-4567.

Perret, F. et al., "Synthesis, Solid State Structures and Interfacial Properties of New Para-Phosphonato-O-Alkoxy-Calix[8]Arene Derivatives", New Journal of Chemistry, 31, (2007), pp. 893-900.

Sawaguchi, T. et al., "Electrochemical Scanning Tunneling Microscopy and Ultrahigh-Vacuum Investigation of Gold Cyanide Adlayers on Au(111) Formed in Aqueous Solution", J. Phys. Chem, vol. 99, No. 38, (1995), pp. 14149-14155.

Schardt, B.C. et al., "Surface Coordination Chemistry of Well-Defined Platinum Electrodes: Surface Polyprotic Acidity of Pt(111)$(2\sqrt{3}\times 2\sqrt{3})R30°$-CNH", Inorg. Chem., vol. 24, No. 10, (May 8, 1985), pp. 1419-1421.

Schmidt, T.J., et al., "Properties of High-Temperature PEFC Celtec®-P 1000 MEAs in Start/Stop Operation Mode", J. Power Sources, 176, (2008), pp. 428-434.

Stamenkovic, V.R. et al., "Improved Oxygen Activity on Pt3Ni(111) via Increased Surface Site Availability", Science 315, (Jan. 26, 2007), pp. 493-497.

Stickney, J.L. et al., "Ordered Ionic Layers Formed on Pt(111) From Aqueous Solutions", Langmuir, 1, (1985), pp. 66-71.

Strasser, P. et al., "Lattice-Strain Control of the Activity in Dealloyed Core-Shell Fuel Cell Catalysts", Nature Chemistry, 2, (Jun. 2010), pp. 454-460.

Srivastava, R. et al., "Efficient Oxygen Reduction Fuel Cell Electrocatalysis on Voltammetrically Dealloyed Pt-Cu-Co Nanoparticles", Angew, Chem. Int. Ed. 46, (2007), pp. 8988-8991.

Strmcnik D., et al., "Absorption of Hydrogen on Pt(111) and Pt(100) Surfaces and Its Role in the HOR", Electrochem. Comm., 10, (2008), pp. 1602-1605.

Strmcnik, D. et al., "The Role of Non-Covalent Interactions in Electrocatalytic Fuel-Cell Reactions on Platinum", Nature Chem. 1, (Sep. 2009), pp. 466-472.

Strmcnik, D., et al., "Enhanced Electrocatalysis of the Oxygen Reduction Reaction Based on Patterning of Platinum Surfaces with Cyanide", Nature Chemistry, vol. 2, Oct. 2010, pp. 880-885.

Strmcnik, D.S., et al., "Relationship between the Surface Coverage of Spectator Species and the Rate of Electrocatalytic Reactions", J. Phys. Chem. C., 111, (2007), pp. 18672-18678.

Stuhlmann, C., Characterization of an Electrode Adlayer by In-Situ Infrared Spectroscopy: Cyanide on Pt(111), Surf. Sci., 335, (1995), pp. 221-226.

(56) References Cited

OTHER PUBLICATIONS

Stuhlmann, C. et al., "Scanning Tunneling Microscopy and Infrared Spectroscopy as Combined in Situ Probes of Electrochemical Adlayer Structure. Cyanide on Pt(111)", Chem. Phys. Lett, 219, (Mar. 11, 1994), pp. 319-324.

Wang, J. et al., "Fabrication and Evaluation of Platinum/Diamond Composite Electrodes for Electrocatalysis—Preliminary Studies of the Oxygen-Reduction Reaction", J. Electrochem. Soc, 150, No. 1, (2003), pp. E24-E32.

Non-Final Office Action on U.S. Appl. No. 13/245,395, mailed Dec. 26, 2012.

Final Office Action on U.S. Appl. No. 13/245,395, mailed Jun. 7, 2013.

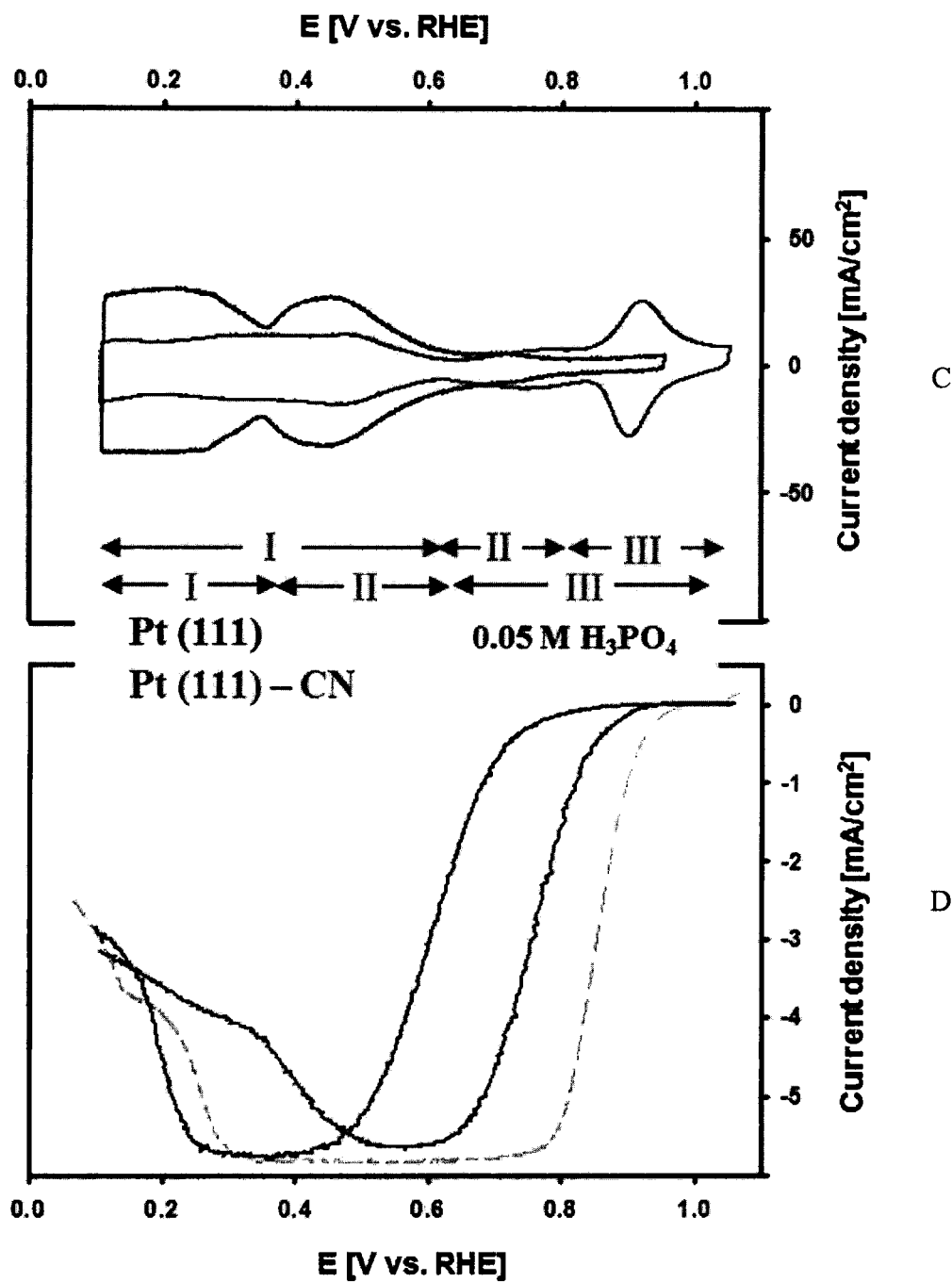
FIG. 1 contd.

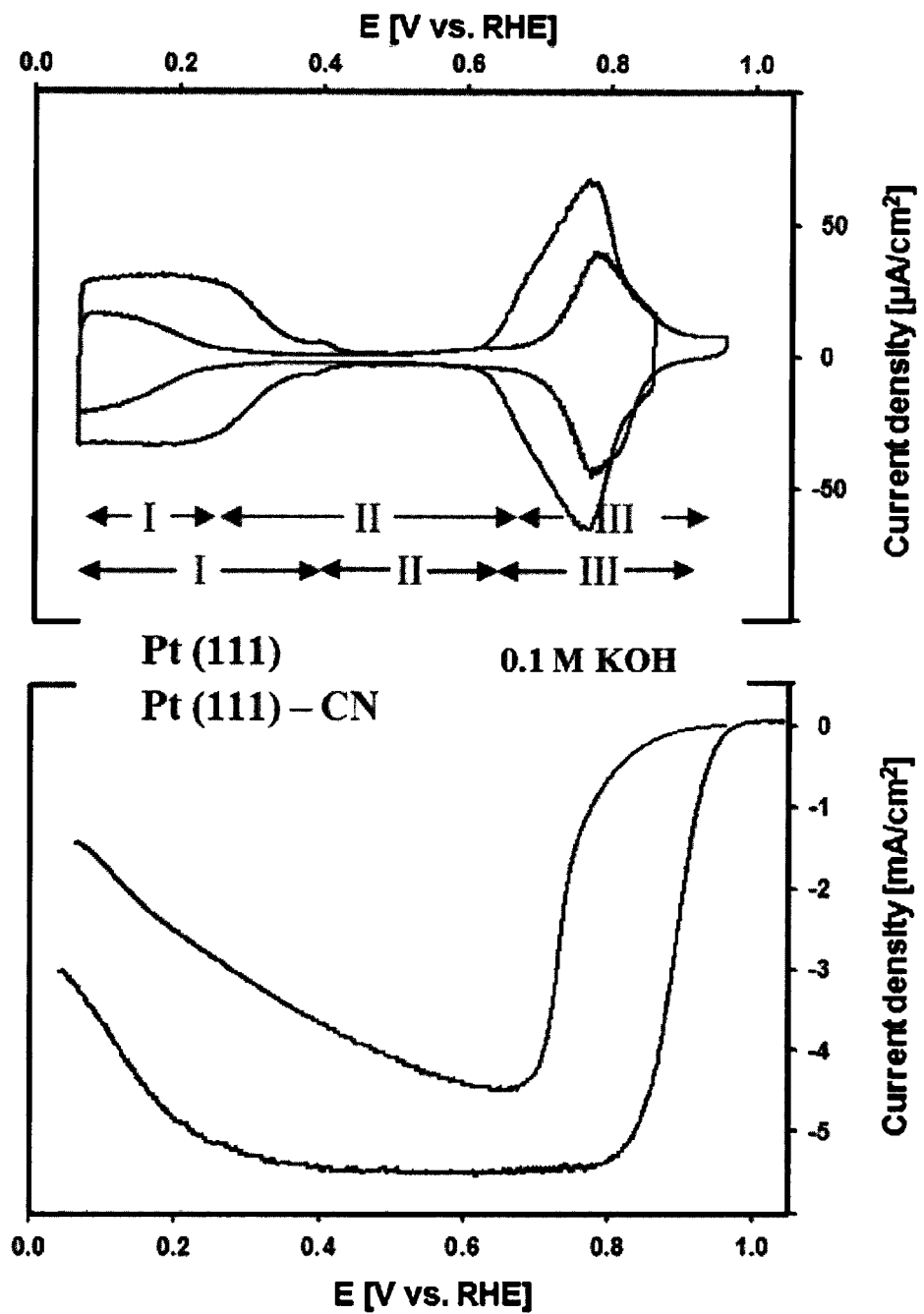
FIG. 2 contd.

FUEL CELL ELECTRODES

CROSS-REFERENCE TO RELATED APPLICATIONS

This application claims the benefit of U.S. Provisional Patent Application Nos. 61/502,412, filed on Jun. 29, 2011; and 61/512,590, filed on Jul. 28, 2011, the entire disclosures of which are incorporated herein by reference for any and all purposes.

GOVERNMENT RIGHTS

This invention was made with Government support under Contract No. DE-AC02-06CH11357 awarded by the Department of Energy. The Government has certain rights in this invention.

FIELD

The present technology relates generally to modified electrodes and methods of making and using the same.

BACKGROUND

The following description is provided to assist the understanding of the reader. None of the information provided or references cited is admitted to be prior art to the present technology.

The development of new materials that can solve the challenging problems of clean energy production, conversion and storage is of paramount importance in the quest for alternatives to fossil fuel use. One promising candidate is a fuel cell, a device that converts chemical energy directly into electrical energy. In a polymer electrolyte membrane fuel cell (PEMFC), an alkaline fuel cell (AFC), or a phosphoric acid fuel cell (PAFC), the main fuel is hydrogen, which, when reacted with oxygen, produces water as the only reaction product. However, to make hydrogen-based energy systems viable on a large scale, many problems still need to be resolved. These are mainly connected with new catalyst materials focusing primarily on three characteristics: activity, stability and selectivity. Improvement of these features presents the major roadblock to a wide commercialization of fuel cells.

Presently the state of the art approach for changing these properties undoubtedly entails changing the electronic properties of the catalyst in some way, shape or form. This approach rests on the premises that changing the catalyst's electronic structure will (i) change the adsorption free energy of reactants and products thus increasing the activity for a desired reaction, (ii) change the stability of catalyst by making the metal (or other active material) less soluble in relatively aggressive electrolytes and (iii) only effect activity for one reaction at the catalyst's surface. The possible beneficial effect of this approach has been extensively supported and advertised by theoretical work.

In the recent past, it has been shown many times that for platinum group and platinum based catalyst, the activity is determined by the solution side rather than the metal side of the catalyst. The term spectator species has been introduced for molecules, which come from the supporting electrolyte and essentially block the surface sites so that they are unavailable for the electrochemical reaction. These species do not alter the electronic properties of the surface nor do they participate in the reaction, hence they are spectators. In general these species greatly influence all three characteristics of the catalyst. By introducing the concept of chemically modified electrodes (CME) it is possible to enhance catalyst's activity, stability and selectivity without changing its electronic properties.

SUMMARY

In one aspect, a process is provided including patterning a surface of a platinum group metal-based electrode by contacting the electrode with an adsorbate to form a patterned platinum group metal-based electrode having platinum group metal sites blocked with adsorbate molecules and platinum group metal sites which are not blocked. The sites are over all the metal particles or atoms at the surface of the electrode. As used herein a platinum group metal is one or more of the metals in the platinum group as are known in the art. For example, in some embodiments, the platinum group metal-based electrode may include Pt, Pd, Ir, or Rh, or a alloy thereof. For example, the platinum group metal-based electrode may include Pt, Pd, Ir, or Rh or an alloy of any of these with one or more of Co, Ni, Fe, Ti, Cr, V, or Mn. In some embodiments, the platinum group metal-based electrode includes Pt, or Pd, or an alloy Pt or Pd with one or more of Co, Ni, Fe, Ti, Cr, V, or Mn. In some embodiments, the platinum group metal-based electrode includes a surface of Pt(100), Pt(111), Pt(1099), or polycrystalline Pt. In any of the processes of this paragraph, the adsorbate includes cyanide.

In any of the processes of the preceding paragraph, the patterning includes heating the platinum group metal-based electrode to an annealing temperature from about 500 K to about 1500 K under a reducing atmosphere, cooling the electrode, and immersing the electrode in a solution comprising the adsorbate. Where the adsorbate includes cyanide, the solution includes an aqueous solution of a cyanide. Such cyanides include, but are not limited to, HCN, NaCN or KCN. In such cyanide embodiments, from about 25% to about 40% of the platinum group metal sites are blocked by cyanide and from about 60% to about 75% of the platinum group metal sites are cyanide-free (i.e. unblocked). The platinum group metal-based electrode may include, but is not limited to, surfaces of Pt(100), Pt(111), Pt(1099), or polycrystalline Pt.

In another aspect, an electrode is provided including a platinum group metal-based substrate including adsorbate molecules wherein a portion of the platinum group metal sites are blocked by adsorbate molecules and a portion of the platinum group metal sites are not blocked. In one embodiment, the adsorbate molecules comprise cyanide.

In another aspect, a fuel cell is provided including any of the above electrodes or any of the above electrodes produced by the described processes.

In one aspect, cyanide-modified electrodes, fuel cells including cyanide-modified electrodes, and methods of reducing oxygen are provided. In some embodiments the electrode is a metal selected from the platinum group metals, such as platinum, rhodium, iridium, palladium, ruthenium, osmium, or palladium. In some embodiments, the electrode is a cathode. In some embodiments, the electrodes are molecularly patterned with cyanide. In some embodiments, the electrode is in the presence of a strongly adsorbing electrolyte, such as an anion of sulfuric acid or phosphoric acid.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
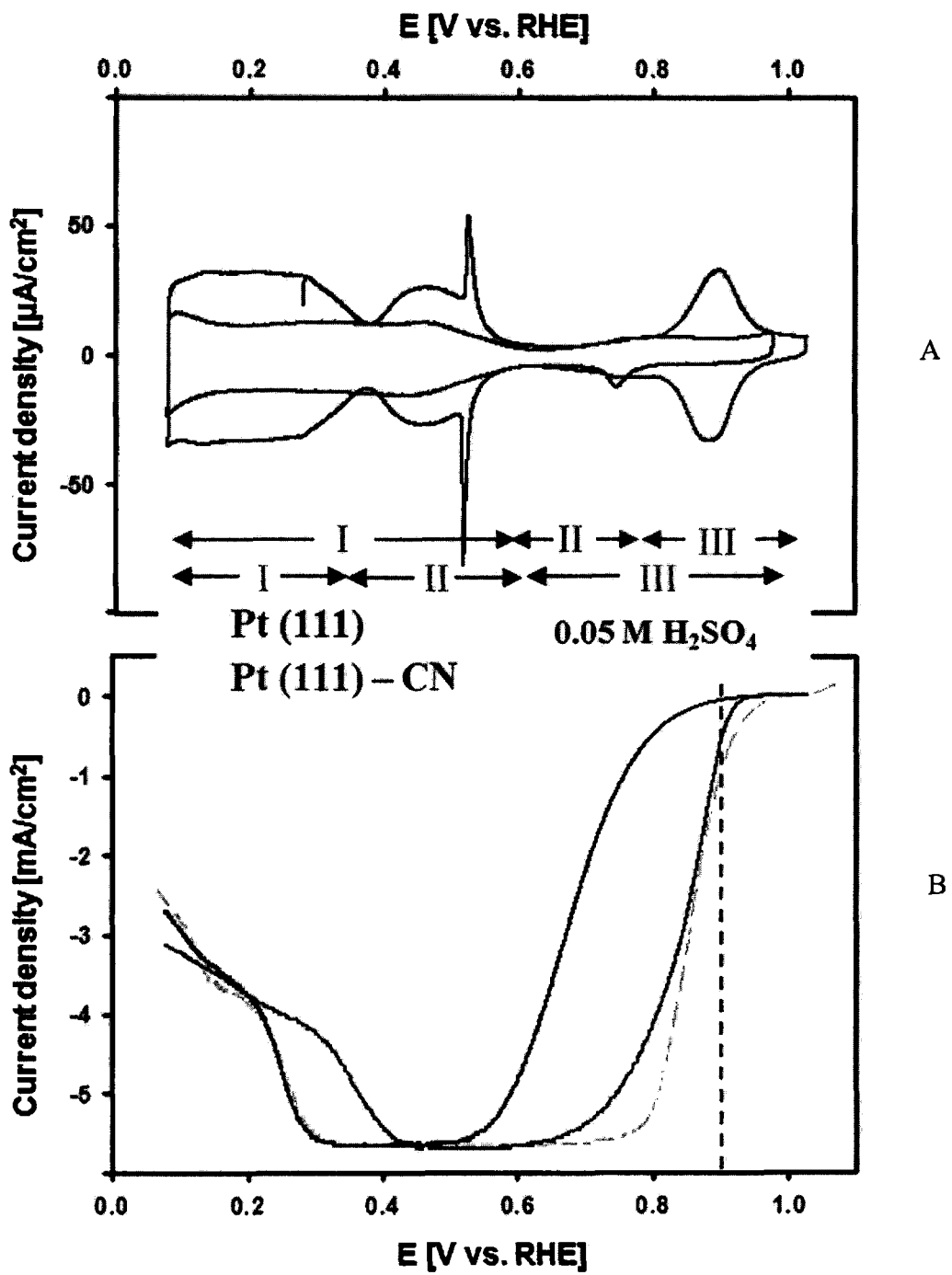
FIGS. 1A, 1B, 1C, and 1D depict electrochemical measurements on CN-modified and unmodified Pt(111) surfaces in solutions containing strongly adsorbing sulfuric and phosphoric acid anions, according to the examples.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The technology is described herein using several definitions, as set forth throughout the specification.

The use of the terms "a" and "an" and "the" and similar referents in the context of describing the elements (especially in the context of the following claims) are to be construed to cover both the singular and the plural, unless otherwise indicated herein or clearly contradicted by context.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The slow rate of the ORR in phosphoric acid fuel cells is one factor limiting wide application of such cells. An approach is presented herein that can be used for the design of cathode catalysts for use in phosphoric acid fuel cells, or in an environment containing adsorbing anions. The catalysts are based on molecular patterning of metal surfaces with cyanide adsorbates that block sites for adsorption of spectator anions while allowing the ORR to proceed unhindered. The approach is based on molecular patterning of metal surfaces with adsorbates. More specifically, it is based on the design of surfaces on which the sites necessary for adsorption of spectator anions have been blocked, while providing a sufficient number of free metal sites to chemisorb the $O_2$ molecule and break the O—O bond (a 4e$^-$ reduction).

In one embodiment, a chemically modified electrode (CME) is provided which is a metal-based electrode patterned with cyanide groups. The metal-based electrodes are modified to include a layer of bound cyanide that effectively blocks the adsorption of spectator anions while the ORR proceeds largely unhindered. Such modification provides at least a 10- to 25-fold improvement of catalyst's activity for the ORR, as compared to the same electrode without such modification with cyanide.

Thus, in one embodiment, an electrode includes a metal-based substrate to which a cyanide adsorbate is attached. The metal-based substrate may include an active metal catalyst such as Pt, Ru, Rh, Pd, Os, Ir, Fe, Co, Ni, or a combination or alloy of such metals. In some embodiments, the metal is Pt, Ru, Rh, Pd, Os, or Ir. In other embodiments, the metal is Pt. The metal-based substrate may be a purified platinum metal. Such metals include those having a Pt(100), Pt(1099), or Pt(111) surface, or those that are a polycrystalline Pt (i.e. Pt(Poly)).

The cyanide adsorbate molecules block a portion of the active catalytic metal sites from poisoning by other anionic species in the electrolyte solutions which are in contact with the electrodes. For example, the electrodes may be in contact with electrolytes that include sulfate or phosphate anions. These anions are known to bind more strongly to a number of catalytic metals than oxygen which is subject to the ORR. The cyanide blocks a number of the active metal sites to prevent or minimize the approach of poisoning anionic species. The amount of blocked and non-blocked metal sites may vary. In one embodiment, from about 25% to about 40% of the metal sites are blocked by the adsorbate molecules and from about 60% to about 75% of the metal sites are adsorbate-free.

In another aspect, a process is provided for preparing a metal-based electrode having a cyanide adsorbate. Such processes include patterning a surface of a metal-based electrode by contacting the electrode with a cyanide-containing solution to form a patterned metal-based electrode. The electrode includes both metal sites blocked with adsorbate molecules and Pt metal sites which are not blocked. The electrode produced by the process may be as described above for the metal-based electrode patterned with cyanide.

The process of patterning may include heating the metal-based electrode to an annealing temperature from about 500 K to about 1500 K under a reducing atmosphere to anneal the metal surface and activate it toward reaction with the cyanide. In some embodiments, the annealing temperature is from about 1000 K to about 1200 K. The reducing atmosphere may include hydrogen gas, or hydrogen gas mixed with an inert gas. Illustrative inert gases include, but are not limited to, nitrogen, neon, helium, and argon. Where the hydrogen is mixed with the inert gas, the ratio of hydrogen to inert gas may be from about 0.5 vol % to 50 vol %. In some embodiments the ratio is from about 1 vol % to about 10 vol %. In yet other embodiments, the ratio is from about 1 vol % to about 5 vol %.

After heating, the annealed metal electrode is then cooled to ambient temperature. The cooled, annealed metal-based electrode may then be covered by a droplet of water to protect the annealed surface before contacting the electrode with the cyanide, or the cooled, annealed metal-based electrode may be contacted directly with the cyanide. In one embodiment, the cyanide is present in an aqueous solution. For example, the cyanide may be present in solution as HCN, NaCN, KCN, trimethylsilylcyanide, tetrabutylammonium cyanide, or any other inorganic cyanide that produces CN$^-$ anions when dissolved in water. According to various embodiments, the concentration of the aqueous cyanide is from about 10 μM to about 500 μM.

In another aspect, a metal-based electrode produced by such methods is provided.

As noted above, the electrodes described above, both as described and as produced by the described methods, may be used in fuel cells. Accordingly, in one aspect, a PAFC fuel cell is provided including the metal-based electrode comprising the cyanide adsorbate. Such fuel cells include, but are not limited to, the electrodes as described above and an electrolyte. For example, in one embodiment a fuel cell includes a cathode, an anode and a phosphoric acid-based electrolyte. The cathode catalyst is platinum or platinum group metal or an alloy thereof modified with cyanide. The anode catalyst is platinum or platinum group metal or an alloy thereof.

The present technology, thus generally described, will be understood more readily by reference to the following examples, which are provided by way of illustration and are not intended to be limiting.

EXAMPLES

As a general note, all gases used in the following examples were of 5N5 quality and were purchased from Airgas. The sweep rate for all RRDE measurements was 50 mV s$^{-1}$. For the ORR measurements, the electrode was rotated at 1,600 rpm. Electrode potentials are given versus the RHE.

Example 1

Enhanced Electrocatalysis of the Oxygen Reduction Reaction Based on Patterning of Platinum Surfaces with Cyanide Polarization curves and cyclic voltammetry curves were recorded for CN-free Pt(111) and CN-modified Pt(111) surfaces. The sweep rate for all measurements was 50 mV s$^{-1}$, and for the ORR measurements the electrode was rotated at 1,600 rpm. Electrode potentials are stated versus the reversible hydrogen electrode (RHE). The activity comparison is based on the kinetic current ratio between the unmodified and modified surfaces at 0.85 V for $H_2SO_4$ and $H_3PO_4$ and at 0.9 V for $HClO_4$ and KOH.

Electrochemical experiments. The Pt(111) electrode was prepared by inductive heating for 10 min at ~1,100 K in an argon hydrogen flow (3% hydrogen). The annealed specimen was cooled slowly to room temperature in this flow stream and immediately covered by a droplet of water. The electrode was then immersed, open circuit, in a 0.1 M KCN solution for 25 minutes allowing the formation of an irreversibly adsorbed CN adlayer. As demonstrated herein, irreversibly formed $CN_{ad}$ on platinum shows unique selectivity towards the adsorption of spectator anions and reactants.

After extensive rinsing, the electrode was embedded into a rotating disk electrode (RDE), which was then placed in a standard three-compartment electrochemical cell containing either 0.1 M $HClO_4$, 0.05 M $H_2SO_4$, 0.05 M $H_3PO_4$ or 0.1 M KOH. In each experiment, the electrode was immersed at 0.27 V in a solution saturated with $O_2$. After five cycles between 0.07 and 1.05 V the polarization curve for the ORR was recorded in all three electrolytes (FIGS. 1B and 1D and FIGS. 2B and 2D). Subsequently, oxygen was purged out of the solution and the voltammetric response was recorded in argon-purged solutions. To confirm that $CN_{ad}$ coverage is the same in both alkaline and acid solutions, after recording a CV in alkaline solution the Pt(111)-$CN_{ad}$ electrode was transferred into perchloric acid solution and a CV was recorded subsequently. Given that no large difference is observed between the CVs presented in FIG. 2A and the one recorded after the measurements in alkaline solution, it is concluded that during the ORR, $\Theta_{CNad}$ on Pt(111)-$CN_{ad}$ was the same, irrespective of the nature of the anions and/or the pH of the supporting electrolytes. Notably, on Pt(111)-$CN_{ad}$ in acidic electrolytes, $\Theta_{Hupd}$ will be determined by the $C^{\delta+}N^{\delta-}$—$H^+$ chemistry; in alkaline solutions, however, $\Theta_{Hupd}$ will be governed by the $C^{\delta+}N^{\delta-}$-$M^{n+}$ (M=Li, Na, K, Ba and so on) non-covalent interactions. Consequently, analysis of $\Theta_{Hupd}$ would not provide useful information on the coverage by $CN_{ad}$. The results presented herein show that the ORR activity on Pt(111)-$CN_{ad}$ can go from a 25-fold increase in the presence of sulfuric acid anions and a tenfold increase in the presence of phosphoric acid anions, to no effect in the presence of perchloric acid anions, and to a 50-fold decrease in alkaline solutions.

Figure 2:
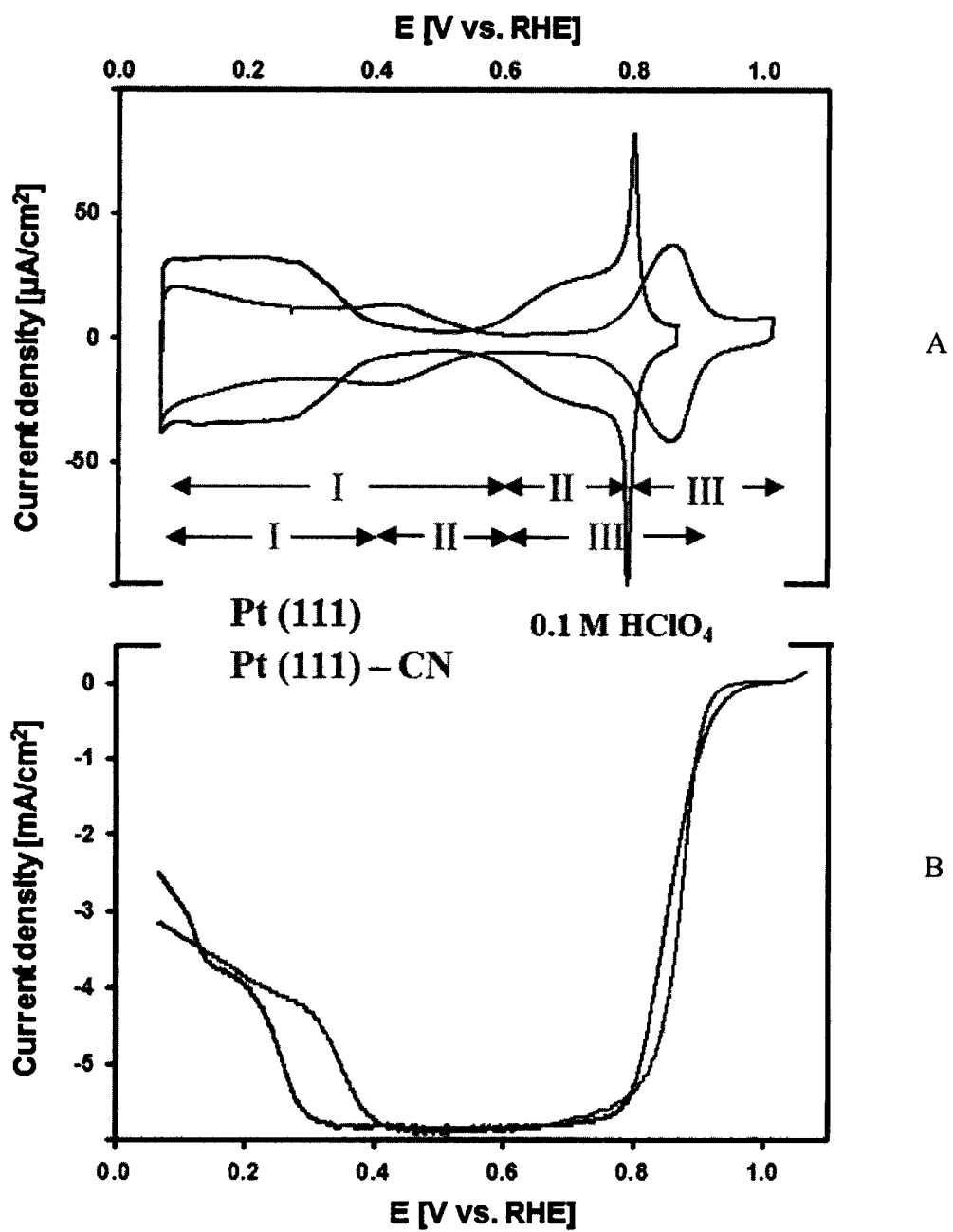
FIGS. 2A, 2B, 2C, and 2D depict electrochemical measurements on CN-modified and unmodified Pt(111) surfaces in solutions containing weakly adsorbing perchloric acid anions and hydrated alkali metal cations, according to the examples.

FIG. 1 summarizes the electrochemical responses of Pt(111) modified and unmodified systems in sulfuric acid and phosphoric acid. FIG. 2 summarizes the electrochemical responses of Pt(111) modified and unmodified systems in perchloric acid and hydrated alkali metal cation systems. A brief description of cyclic voltammograms (CVs) of Pt(111) in 0.05 M $H_2SO_4$ (FIG. 1A), 0.05 M $H_3PO_4$ (FIG. 1C), 0.1 M $HClO_4$ (FIG. 2A) and 0.1 M KOH (FIG. 2C) is provided. Three potential regions are clearly visible in the presence of sulfate and phosphate anions: adsorption of hydrogen (historically denoted as underpotential deposited hydrogen, $H^+ + e^- \leftrightarrow H_{upd}$) in region I is followed first by adsorption of sulfate/phosphate anions (region II) and then by a small pseudocapacitance that corresponds to OH/anion adsorption (region III). In 0.1 M $HClO_4$ (FIG. 2A) and 0.1 M KOH (FIG. 2C), however, the $H_{upd}$ adlayer formation in region I (notice that in alkaline solutions $H_{upd}$ is formed from $H_2O \leftrightarrow H_{upd} + OH^- + e^-$) is followed first by a double layer capacitance (region II) and then by OH adsorption in the potential region III. The $CN_{ad}$ groups act largely through a steric, site-blocking mechanism (ensemble or 'third-body' effect) in which a surface arrangement of $CN_{ad}$ may or may not allow solution species to react with the surface, as is clearly evident in the CVs of the Pt(111)-CN electrode in FIGS. 1-2.

With regard to FIG. 1, cyclic voltammograms for the $CN_{ad}$-free (black curves) and $CN_{ad}$-covered (dark gray) Pt(111) surfaces recorded in argon-saturated sulfuric and phosphoric acid solutions are shown in FIGS. 1A and 1C, and the corresponding anodic scan polarization curves for the ORR recorded in $O_2$ saturated solutions are shown in FIGS. 1B and 1D. Gray-dashed curves correspond to the ORR in 0.1 M perchloric acid. A small pseudocapacitance observed for Pt(111)-$CN_{ad}$ between 0.6 and 0.85 V corresponds to the adsorption of sulfuric (~5 μC cm$^{-2}$) and phosphoric (~10 μC cm$^{-2}$) acid anions. The charge in the OH adsorption region (from 0.85 to 1.0 V) increases from 55 μC cm$^{-2}$ in the presence of phosphoric acid anions to 70 μC cm$^{-2}$ in the presence of sulfuric acid anions. The sweep rate was 50 mV s$^{-1}$. Polarization curves for the ORR were measured at 1,600 rpm and 20° C., where I, II and III in the figures designate the potential regions of $H_{upd}$ adsorption, anion adsorption and OH adsorption, respectively. The dashed vertical line in FIG. 1B allows easy comparison of the current density at 0.9 V for the CN-modified and unmodified Pt surfaces.

With regard to FIG. 2, cyclic voltammograms for the $CN_{ad}$-free (black curves) and $CN_{ad}$-covered (dark gray) Pt(111) surface recorded in argon-saturated perchloric acid and potassium hydroxide solutions are shown in FIGS. 2A and 2C, and the corresponding anodic scan polarization curves for the ORR recorded in $O_2$ saturated solutions are shown in FIGS. 2B and 2D. Note that, because there is no extra adsorption of anions between 0.60 and 0.85 V on Pt(111)-$CN_{ad}$, the charge corresponding to OH adsorption between 0.70 and 1.00 V in $HClO_4$ (85 μC cm$^{-2}$) and KOH (105 μC cm$^2$) in FIGS. 2A and 2C, respectively, is higher than in the presence of strongly adsorbing sulfuric (70 μC cm$^2$) and phosphoric acid (55 μC cm$^{-2}$) anions. The sweep rate was 50 mV s$^{-1}$. Polarization curves for the ORR were measured at 1,600 rpm and 20° C., where I, II and III designate the potential regions of $H_{upd}$ adsorption, double-layer charging, $OH_{ad}$ formation, respectively.

In all four electrolytes, CVs of Pt(111)-$CN_{ad}$ are significantly different from Pt(111), which is in agreement with previous results. The fact that the CV of Pt(111)-$CN_{ad}$ in 0.1

M $HClO_4$ (FIG. 2A) is qualitatively very similar to those observed in 0.05 M $H_2SO_4$ (FIG. 1A) and in 0.05 M $H_3PO_4$ (FIG. 1C) suggests that $CN_{ad}$ molecules indeed act as a third body—selectively blocking the adsorption of sulfuric and phosphoric acid anions. Given that FIGS. 1A and 1C reveal the appearance of small pseudocapacitive features prior to the onset of OH adsorption (region II), it appears that a tiny adsorption of sulfate/phosphate anions is still possible even on the CN-modified Pt(111) surface. Therefore, it can be concluded that on Pt(111)-$CN_{ad}$ the adsorption of sulfuric and phosphoric acid anions is almost completely suppressed by the so-called third-body effect. In contrast, the formation of $H_{upd}$ (region I) and $OH_{ad}$ (region III) adlayers on $CN_{ad}$-free platinum sites is clearly observed in the CVs, confirming the selectivity of the Pt(111)-$CN_{ad}$ electrode. Furthermore, the fact that on Pt(111)-$CN_{ad}$ the onsets of $H_{upd}$ and the peak position of $OH_{ad}$ are shifted positively relative to unmodified Pt(111) strongly suggests that the $CN_{ad}$ adlayer may also alter the $H_{upd}$ and $OH_{ad}$ energetics. Although the reason for this behavior has never been discussed before, it has been noted previously (Cuesta, A. et al. *Phys. Chem. Chem. Phys.* 10, 3628-3634 (2008)) that such a positive shift of about 0.20 V in the onset potential for $H_{upd}$ implies an increase of about 19 kJ $mol^{-1}$ in $\Delta G^0_{Hupd}$ ($\theta$=0). In general, there are four common causes for interactions between co-adsorbates: (i) direct interactions between adsorbate states; (ii) indirect interactions characteristic of systems where one adsorbate may change the electronic structure of the surface, altering the adsorption energy of a second adsorbate; (iii) elastic interactions in which adsorbate-induced distortions of the surface lattice are usually experienced by other adsorbates; and (iv) electrostatic effects that are in fact dipole-dipole interactions.

In acid environments (FIG. 1A, FIG. 1C and FIG. 2A), it appears that the $CN_{ad}$ affects the Pt—$H_{upd}$ and Pt—$OH_{ad}$ energetics mainly by direct interactions and electrostatic effects, respectively. Direct interactions may play an important role in the Pt—$H_{upd}$ interactions because of the expectedly strong tendency of the negative charge of the $CN_{ad}$ dipole to interact with the oppositely charged $H^+$ (or, in general, with $M^{n+}$; see below) and to form hydrogen isocyanide ($CN_{ad}$ $H_{upd}$) molecules on the platinum surface. Stickney, J. L. et al. *Langmuir* 1, 66-71 (1985) and Kim, Y. G. et al. *J. Am. Chem. Soc.* 118, 393-400 (1996). In turn, this may cause an enhanced thermodynamic driving force for the Pt—$H_{upd}$ interaction, resulting in an earlier formation (~0.2 V) of the $H_{upd}$ adlayer on the Pt(111)-$CN_{ad}$ surface, as compared with Pt(111). This is the only example of a positive shift in the onset potential for $H_{upd}$ formation. On the other hand, the Pt—$OH_{ad}$ bond weakening (exemplified as a positive shift in the formation of $OH_{ad}$, ~0.1 V) can be most simply understood in terms of electrostatic through-space repulsive interactions between the electronegative $CN_{ad}$ adlayer and the large negative dipole moment associated with $OH_{ad}$.

In contrast to acidic solutions, the most notable voltammetric features of Pt(111)-$CN_{ad}$ in 0.1 M KOH (FIG. 2C) are a negative shift (~0.2 V) in the onset of hydrogen adsorption (region I) and essentially no change in the peak position of $OH_{ad}$ (region III). Notice also a large decrease in the fractional surface coverage ($\Theta$) of hydrogen, $\Theta_{Hupd}$, in alkaline as compared to acidic media, indicating that the formation of $H_{upd}$ and $OH_{ad}$ adlayers in alkaline and acid solutions are not governed by the same surface chemistry. These differences can be exemplified in terms of the involvement of interactions between $K^+(H_2O)_x$ and $CN_{ad}$, which may lead to the formation of $K^+(H_2O)_x$—$CN_{ad}$ clusters, which, in turn, interact weakly with adsorbed $OH_{ad}$. Consequently, FIG. 2C shows that the peak position for $OH_{ad}$ is the same on $CN_{ad}$-free and $CN_{ad}$-modified Pt(111) surfaces. Accordingly, $K^+(H_2O)_x$—$CN_{ad}$ may be considered to be 'quasi-specifically adsorbed' on platinum, hence acting like site blockers for adsorption of reactants such as $O_2$ and $H_2O$. For example, the markedly smaller $\Theta_{Hupd}$ on Pt(111)-$CN_{ad}$ in KOH than in acid solutions is indicative of a strong blocking effect of $K^+(H_2O)_x$—$CN_{ad}$ clusters, denying the access of water to the platinum surface atoms the same way as to $O_2$ molecules during the ORR. Overall, then, it appears that the role of $CN_{ad}$ on the energetics of co-adsorbed $H_{upd}$ and $OH_{ad}$ can be transformed from largely adsorbate—adsorbate electronic effects in acid solutions to predominantly third-body effects in alkaline environments. As further described below, such behavioral differences will have important consequences for understanding dramatic effects of $CN_{ad}$ on the ORR.

As a starting point, it is reasonable to summarize some general observations concerning the ORR on a $CN_{ad}$-free Pt(111) surface. First, owing to the strong adsorption of tetrahedral sulfuric and phosphoric acid anions on Pt(111), an exceptionally large deactivation of the ORR is observed in FIGS. 1B and 1D. Second, although the activity is significantly higher in $HClO_4$ (FIG. 2B) and KOH (FIG. 2D) a series 4$e^-$ pathway is operative in all environments above 0.35 V (refs 34-36). Third, above 0.85 V the ORR in alkaline solutions is controlled by the surface coverage of 'specific-like' adsorbed $OH_{ad}$-$M^+(H_2O)_x$ clusters that can effectively block $O_2$ adsorption. Fourth, irrespectively of pH, below 0.4 V the change in the 4$e^-$ to 2$e^-$ reaction pathway is due to the formation of $H_{upd}$ (refs 34-36). Fifth, $O_2$ and reaction intermediates are adsorbed to a low coverage (they are not the major part of $\Theta_{ad}$ in Equation (1) below) and play a rather small role in controlling the rate of the ORR on platinum. Based on these experimental facts and assuming a small change of the apparent standard free energy of adsorption of $O_2$ and its reaction intermediates with the surface coverage by adsorbing species, the general rate expression (current density i at a constant electrode potential) for the ORR on metal surfaces is proposed to be (here the findings in refs 4,11 are combined) as shown in Equation (1)

$$i_{E_1} = nFK_1 c_{O_2}[1-\Theta_{cov}(\Delta G_{c\text{-}spec})-\Theta_{non\text{-}cov}(\Delta G_{nc\text{-}spec})] \quad (1)$$

where n is the number of electrons, $K_1$ is a constant, $c_{O_2}$ is the concentration of $O_2$ in the solution, and $\Theta_{cov.}+\Theta_{non\text{-}cov.}=\Theta_{ad}$ is the fraction of the surface masked by the site-blocking covalently and non-covalently bound species. It is noted that the surface coverage of covalently bound spectator adsorbates on platinum and platinum-group metals is indeed dependent of the metal-spectator energetics ($\Delta G_{c\text{-}spec}$), so in Equation (1) the rate is strongly dependent on the nature of the metal catalysts; hence $i \propto \Theta_{cov}(\Delta G_{c\text{-}spec})$. Moreover, the coverage by non-covalently bound species and, thus, the current i, is also determined by the free energy of interaction between the covalently bound spectators and hydrated ions in the OHP, in Equation (1) the $\Theta_{non\text{-}cov}$ ($\Delta G_{nc\text{-}spec}$) term. Generally, the relevant covalent adsorbates are strongly adsorbing anions ($\Theta_{anions}$), $OH_{ad}(\Theta_{OHad})$ and $H_{upd}(\Theta_{Hupd})$, and in this particular case also $CN_{ad}$, with a constant coverage ($\Theta_{CN}$) between 0.1 and 1.1 V. The only non-covalent adsorbates considered so far were the $M^+(H_2O)_x$—$OH_{ad}$ clusters.

Figure 3:
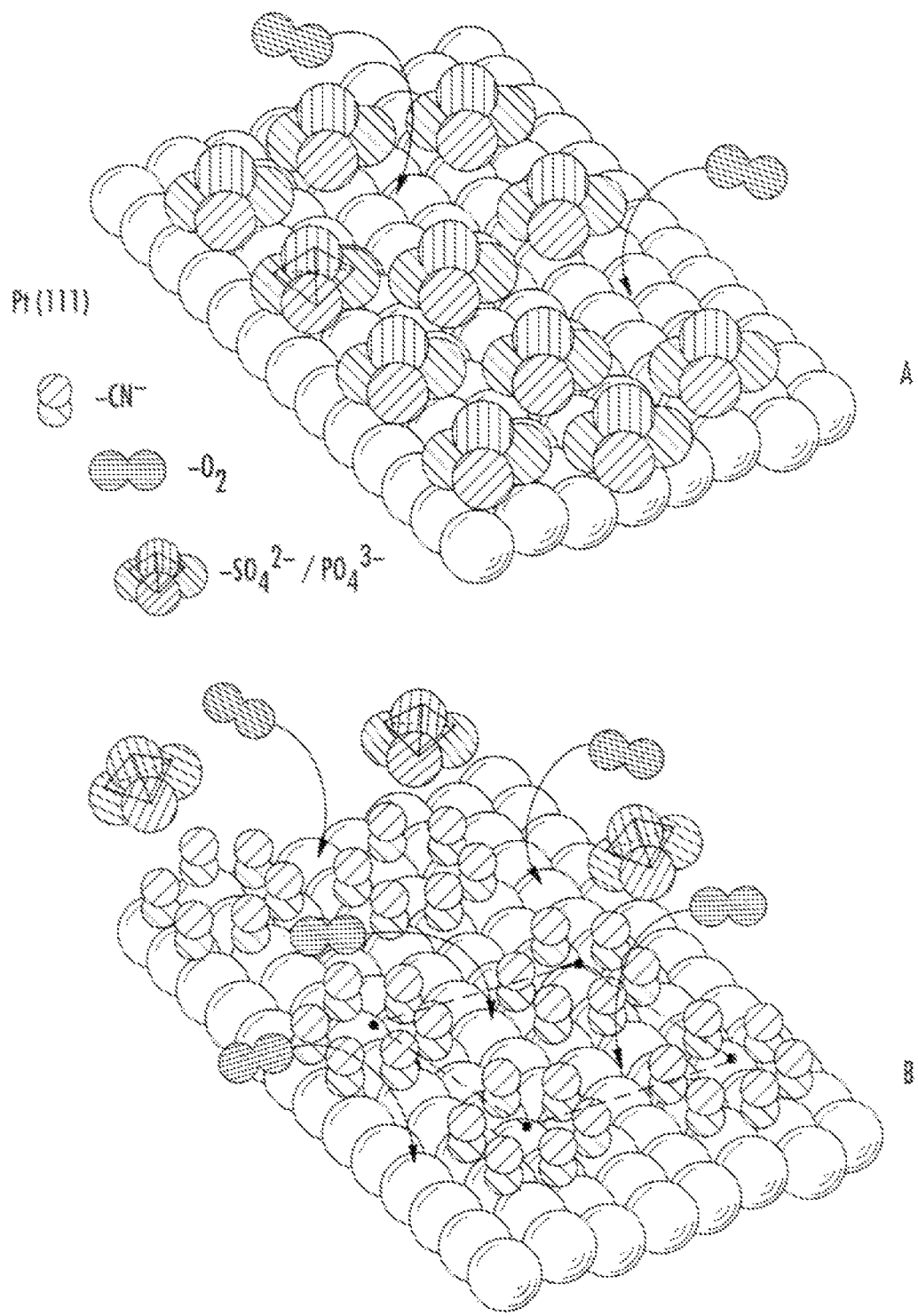
FIGS. 3A and 3B are graphic illustrations of proposed models for selective adsorption of spectator species and reactants and schematic presentation of the availability of platinum surface atoms for adsorption of $O_2$ molecules on CN-free and CN-covered Pt(111), according to one embodiment.

At 0.85 V, FIG. 1 shows a massive increase in the rate of the ORR on the Pt(111)-$CN_{ad}$ surfaces compared to the corresponding Pt(111)—more than a factor of 10 in phosphoric acid solution and a factor of 25 in sulfuric acid solution. Without being bound by theory, this enhancement is in complete agreement with the idea that the primary role of $CN_{ad}$ is to block selectively the adsorption of phosphoric and sulfuric acid anions, while allowing adsorption of $O_2$ on the free platinum sites (FIG. 3). As shown in FIG. 3A, on Pt(111) covered by phosphoric/sulfuric acid anions, $O_2$ can access the surfaces atoms only through a small number of holes in the adsorbate anion adlayer. As shown in FIG. 3B, the number of holes required for $O_2$ adsorption is significantly increased on the Pt(111)-$CN_{ad}$ surface because adsorption of phosphoric/sulfuric acid anions is suppressed by the CN adlayer so that the total $CN_{ad}/OH_{ad}$ coverage is lower than the coverage by sulfuric or phosphoric acid anions. FIG. 1 also shows that the activity for the ORR on Pt(111)-$CN_{ad}$ in sulfuric acid solution is similar to perchloric acid solution, suggesting that sulfuric acid anion adsorption is almost completely inhibited on the Pt(111)-$CN_{ad}$ surface and that the activity is controlled completely by $\Theta_{OHad}$ and $\Theta_{CNad}$. Given that the adsorption of phosphoric acid anions is not completely suppressed by a $CN_{ad}$ adlayer, it is not surprising that in phosphoric acid solution the ORR on Pt(111)-$CN_{ad}$ is less active than in perchloric/sulfuric acid solutions. Furthermore, analysis of the polarization curves for the ORR summarized in FIG. 1 indicates that the $4e^-$ pathway, characteristic for Pt(111) in the kinetically controlled potential region, is also preserved on the Pt(111)-$CN_{ad}$ surface. This is a first indication that the energetics of the adsorption of $O_2$ and its reaction intermediates on platinum is not affected by the surrounding $CN_{ad}$ molecules, confirming that in Equation (1) the activity is almost completely determined by the $(1-\Theta_{cov})$ term.

Additional evidence that the energetics of $O_2$ and its intermediates are not significantly affected by $CN_{ad}$ is obtained from analysis of the ORR results in 0.1 M $HClO_4$ (FIG. 2B). Namely, the fact that the activities are similar on the $CN_{ad}$-free and $CN_{ad}$-covered Pt(111) surfaces is consistent with the picture that during the ORR $CN_{ad}$ acts only as an inert site blocker and that any change of the electronic properties of platinum upon the adsorption of $CN^-$ is such that it has a negligible effect on the rate of the ORR on Pt(111)-$CN_{ad}$.

It is important to point out that the higher activity of Pt(111) than Pt(111)-$CN_{ad}$ above 0.9 V can be explained by the fact that $\Theta_{OHad}$ on a $CN_{ad}$-free surface is slightly smaller than $\Theta_{OHad}+\Theta_{CNad}$ on a $CN_{ad}$-covered surface. The opposite is true for E<0.9 V, and Pt(111)-$CN_{ad}$ becomes slightly more active than Pt(111), see FIG. 2B. Again, these findings suggest that the rate of the ORR is predominantly controlled by the $(1-\Theta_{cov})$ term. Also worth noting is the earlier formation of peroxide (~0.1 V) on the Pt(111)-$CN_{ad}$ surface than on a bare Pt(111) electrode, reflecting the earlier formation of $H_{upd}$ on the former surface and the distinct effect of $H_{upd}$ on blocking platinum sites needed for O—O bond breaking.

Interestingly, the ORR on Pt(111)-$CN_{ad}$ in alkaline solutions is ~50-fold less active in the kinetically controlled potential region (@E=0.9 V) when compared with the Pt(111) surface. FIG. 2D shows that the onset of the ORR is shifted by ~0.2 V in the negative direction and that the diffusion-limited current is not reached. This is entirely consistent with a blocking effect on the adsorption of $O_2$ by the $CN_{ad}$—$K^+(H_2O)_x$ clusters. Note that the $4e^-$ mechanism is still preserved in the kinetic potential region, as checked in the RRDE experiments. Consequently, the role of non-covalent interactions between $CN_{ad}$ and $K^+$ on Pt(111) on the ORR is the same as deduced for $OH_{ad}$—$K^+(H_2O)_x$ clusters in Ref 11; that is, the rate is controlled by both the $\Theta_{cov}$ and $\Theta_{non-cov}$ terms. Importantly, however, FIG. 2D shows that the potential window of deactivation on Pt(111)-$CN_{ad}$ differs significantly from the corresponding CN-free Pt(111) surface. In particular, on Pt(111)-$CN_{ad}$, a strong deactivation is observed in the entire region between 0.1 and 1.0 V, consistent with the remarkable stability of $CN_{ad}$ and, thus, $CN_{ad}$—$K^+(H_2O)_x$ clusters, in the same potential range. On the contrary, $OH_{ad}$—$K^+(H_2O)_x$ clusters on Pt(111) are stable only above 0.80 V, and below this potential have no deactivating effect on the ORR.

Molecular patterning of Pt(111) was used to develop new concepts for designing ORR catalysts in environments containing strongly adsorbing phosphoric and sulfuric acid anions. It was determined that on the CN-covered Pt(111) surface activities of the ORR can change from a 25-/10-fold increase in the presence of sulfuric/phosphoric acid anions to no effect in the presence of perchloric acid anions, to a 50-fold decrease in alkaline solutions. An unprecedented increase in activity in sulfuric and phosphoric acid solutions is rationalized based on the premise that the $CN_{ad}$ molecules can block the sites for adsorption of covalently bonded spectator sulfuric/phosphoric anions but still provide a sufficient number of free platinum sites first to chemisorb the $O_2$ molecule and then to break the O—O bond. On the other hand, a huge deactivation in alkaline solutions is consistent with the involvement of non-covalent interactions between $CN_{ad}$ and hydrated cations, that is, a blocking effect on the adsorption of $O_2$ by the $CN_{ad}$—$K^+(H_2O)_x$ clusters. Furthermore, given that activities in perchloric acid solution are similar on Pt(111) and Pt(111)-$CN_{ad}$, it is proposed that any change of the electronic properties of platinum upon the adsorption of $CN^-$ is such that it has a negligible effect on the ORR. Therefore, it is proposed that the ORR on Pt(111)-$CN_{ad}$ is almost completely determined by a simple $\Theta_{ad}=(\Theta_{cov}+\Theta_{non-cov})$ term.

Equivalents

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. A process comprising:
    patterning a surface of a platinum group metal-based electrode by contacting the electrode with an adsorbate and electrochemically cycling the electrode in an oxygen saturated solution to form a patterned platinum group metal-based electrode comprising platinum group metal sites blocked with adsorbate molecules and platinum group metal sites which are not blocked.

2. The process of claim 1, wherein the platinum group metal-based electrode comprises Pt, Pd, Ir, or Rh, or a Pt alloy with one or more of Co, Ni, Fe, Ti, Cr, V, or Mn.

3. The process of claim 1, wherein the platinum group metal-based electrode comprises Pt(100), Pt(111), Pt(1099), or polycrystalline Pt.

4. The process of claim 1, wherein the adsorbate comprises cyanide.

5. The process of claim 1, wherein the patterning comprises heating the platinum group metal-based electrode to an annealing temperature from about 500 K to about 1500 K under a reducing atmosphere, cooling the electrode, and immersing the electrode in a solution comprising the adsorbate.

6. The process of claim 5, wherein the annealing temperature is from about 1000 K to about 1200 K.

7. The process of claim 5, wherein the reducing atmosphere comprises hydrogen gas.

8. The process of claim 5, wherein the reducing atmosphere comprises hydrogen gas and an inert gas.

9. The process of claim 8, wherein the inert gas comprises He, Ne, Ar, or $N_2$.

10. The process of claim 5, wherein the electrode is cooled to about ambient temperature.

11. The process of claim 5, wherein the solution comprises an aqueous solution of a cyanide.

12. The process of claim 11, wherein the cyanide comprises HCN, NaCN or KCN.

13. The process of claim 11, wherein a concentration of the cyanide in the aqueous solution is from about 0.01 M to about 2 M.

14. The process of claim 4, wherein from about 25% to about 40% of the platinum group metal sites are blocked by cyanide and from about 60% to about 75% of the platinum group metal sites are not blocked by cyanide.

15. The process of claim 5, wherein the solution comprises a solvent and the adsorbate.

16. A platinum group metal-based electrode produced by the process of claim 1.

17. A platinum group metal-based electrode of claim 16 which comprises Pt(100), Pt(111), Pt(1099), or polycrystalline Pt.

18. A fuel cell comprising the electrode of claim 16.

19. The process of claim 1, wherein the electrochemical cycling is performed at least 5 times.

20. The process of claim 1, wherein the electrochemical cycling is performed from about 0.07 V to about 1.05 V.

* * * * *